United States Patent [19]

Sugiyama et al.

[11] Patent Number: 4,463,388

[45] Date of Patent: Jul. 31, 1984

[54] ROTARY RECORDING MEDIUM CAPABLE OF PERFORMING SPECIAL REPRODUCTION

[75] Inventors: Hiroyuki Sugiyama, Isehara; Ryozo Abe; Masaki Sakurai, both of Yokohama; Yahuhiro Yusa, Fujisawa; Kenji Yoshihara, Chiba, all of Japan

[73] Assignee: Victor Company of Japan, Ltd., Yokohama, Japan

[21] Appl. No.: 338,857

[22] Filed: Jan. 12, 1982

[30] Foreign Application Priority Data

Jan. 14, 1981 [JP] Japan ................................ 56-4418

[51] Int. Cl.³ .............................................. H04N 5/76
[52] U.S. Cl. .................................. 358/342; 360/10.1; 358/907; 369/43
[58] Field of Search ................. 369/43, 44, 50, 111, 369/126; 360/10.1, 10.2; 358/312, 342, 907

[56] References Cited

U.S. PATENT DOCUMENTS 3,854,015 12/1974 Janssen ............................. 360/10.1
4,331,976 5/1982 Kinjo .................................... 369/43
4,340,907 7/1982 Hirata ................................... 369/47

FOREIGN PATENT DOCUMENTS 2715573 10/1977 Fed. Rep. of Germany ........ 369/43
2415403 8/1979 France .................................. 369/43

Primary Examiner—Alan Faber
Attorney, Agent, or Firm—Louis Bernat

[57] ABSTRACT

An apparatus reproduces signals which are recorded on a rotary medium having a main information signal recorded on a spiral main track, with first and second tracking control reference signals which are recorded on sub-tracks positioned between adjacent main tracks. A third tracking control reference signal is recorded on the main or sub-track, on each track turn, during an interval corresponding to the vertical synchronizing signal, within a vertical blanking period of the main information signal. The first and second reference signals are recorded within an interval excluding the interval corresponding to that of the vertical synchronizing signal. A kick pulse is generated for shifting the reproducing element to an adjacent track during a special reproduction mode so that the reproducing element is shifted at an interval other than the interval in which the reproducing element reproduces the vertical synchronizing signal.

5 Claims, 16 Drawing Figures

ROTARY RECORDING MEDIUM CAPABLE OF PERFORMING SPECIAL REPRODUCTION

BACKGROUND OF THE INVENTION

The present invention generally relates to rotary recording medium reproducing apparatuses capable of performing special reproduction, and more particularly to a rotary recording medium reproducing apparatus in which a reproducing element is shifted to an adjacent track in a state where tracking servo is constantly and stably performed upon special reproduction.

A new information signal recording and/or reproducing system has been proposed in a U.S. Patent Application Ser. No. 785,095 entitled "Information Signal Recording System" filed Apr. 6, 1977, now U.S. Pat. No. 4,331,976, of which the assignee is the same as that of the present application. According to this proposed system, the recording system forms pits in accordance with the information signal being recorded along a spiral track on a flat disc-shaped recording medium (hereinafter referred to as a disc), without forming a groove therein. In this reproducing system, a reproducing stylus traces over along this track thereby to reproduce the recorded information signal in response to variations in the electrostatic capacitance.

In this system, since no grooves for guiding the reproducing stylus are provided on the disc, it becomes necessary to record pilot or reference signals on or in the vicinity of a track of the information signal such as a video signal, on the disc. Upon reproduction, the reference signals are reproduced together with the video signal. Tracking control is carried out so that the reproducing stylus accurately traces along the track in response to the reproduced reference signals.

By the use of this previously proposed system, there is no possibility whatsoever of the reproducing stylus or the disc being damaged since the recording track has no groove. The reproducing stylus can trace the same portion of the track repeatedly many times, whereby a special reproduction such as still, slow-motion, or quick-motion reproduction becomes possible.

Thus, in a U.S. patent application Ser. No. 4,813 entitled "Special Reproducing System in an Apparatus for Reproducing Video Signals from a Rotary Recording Medium" filed Jan. 19, 1979, now U.S. Pat. No. 4,340,907, of which the assignee is the same as that of the present application, a special reproducing system in a disc reproducing apparatus was proposed which is capable of performing a special reproduction in which a picture having a motion different from that upon normal reproduction is obtained in an excellent manner.

The special reproducing system comprises a reproducing element for tracing the track of the disc and picking up the recorded signal, a tracking control mechanism for operating in response to kick pulses applied thereto to cause the reproducing element to shift to an adjacent track turn of the spiral track, and a kick pulse generating circuit for generating kick pulses with timings corresponding to the vertical blanking period positions of the recorded video signal, where the kick pulses are of a number corresponding to the number of operational modes for carrying out a special reproduction differing from normal reproduction at every revolution period of the disc, and supplying the kick pulses to the tracking control mechanism. The reproducing element is shifted to an adjacent track turn within the vertical blanking period of the recorded video signal, by the tracking control mechanism responsive to the kick pulses.

Accordingly, the noise introduced when the reproducing element moves to an adjacent track does not appear in the picture, and a special reproduction such as still reproduction, slow-motion and quick-motion reproduction in the forward direction, and normal-speed, slow-motion, and quick-motion reproduction in the backward direction can be performed in which a fine picture is obtained.

In the above previously proposed system, the kick pulses are generated during the interval of the vertical synchronizing signal within the vertical blanking period of the recorded video signal. However, first and second reference signals for tracking control are not recorded within the interval of the vertical synchronizing signal, and only a third reference signal for switching is recorded. Accordingly, tracking control is not performed during the interval of the above vertical synchronizing signal. Generally, since the interval of the vertical synchronizing signal is a short interval in the range of three horizontal scanning periods (3H), even when the tracking control is not performed during this interval, no inconveniences are introduced upon a normal reproduction mode.

However, when the reproducing stylus is forcibly shifted to an adjacent track during the interval of the vertical synchronizing signal when the tracking control is not performed, upon a special reproduction mode, disturbance is introduced in the tracking control operation. Hence, there was a disadvantage in that the tracking control operation became unstable.

Furthermore, in the above disc, the sides on which the first and second reference signals are recorded with respect to the main track changes for each track turn. Hence, when the position where the reproducing stylus is to be shifted is a position where the third reference signal is recorded, it became necessary not to generate the switching signal. On the other hand, when the position where the reproducing stylus is to be shifted is a position where the third reference signal is not recorded, it became necessary to generate the switching signal. Accordingly, the construction of a switching signal generating circuit became complex. Moreover, in a case where the generation of the switching signal is performed by use of a micro-computer, there was a disadvantage in that the program for generating the switching signal became complex.

SUMMARY OF THE INVENTION

Accordingly, it is a general object of the present invention to provide a novel and useful rotary recording medium reproducing apparatus capable of performing special reproduction, in which the above described disadvantages have been overcome.

Another and more specific object of the present invention is to provide a rotary recording medium reproducing apparatus in which kick pulses are generated so that a reproducing element is shifted to an adjacent track within a vertical blanking period, at a position other than where a vertical synchronizing signal exists. According to the reproducing apparatus of the present invention, since the reproducing element is shifted within the vertical blanking period at a position other than where the vertical synchronizing signal exists, reference signals for tracking are reproduced, and the reproducing element is always shifted in a state where the tracking control is stably performed. Hence, even when the reproducing element is shifted, the tracking control is stably performed immediately thereafter.

Still another object of the present invention is to provide a rotary recording medium reproducing apparatus in which a switching signal are always generated when a reproducing element is shifted by a kick pulse, regardless of whether a third reference signal is recorded within a vertical blanking period or not. According to the reproducing apparatus of the present invention, the construction of a switching signal generating circuit becomes simple. Thus, in a case where the switching signal is generated by use of a micro-computer, the program for generating the switching signal is simplified.

Other objects and further features of the present invention will be apparent from the following detailed description when read in conjunction with the accompanying drawings.

BRIEF DESCIPTION OF THE DRAWINGS

Figure 1:
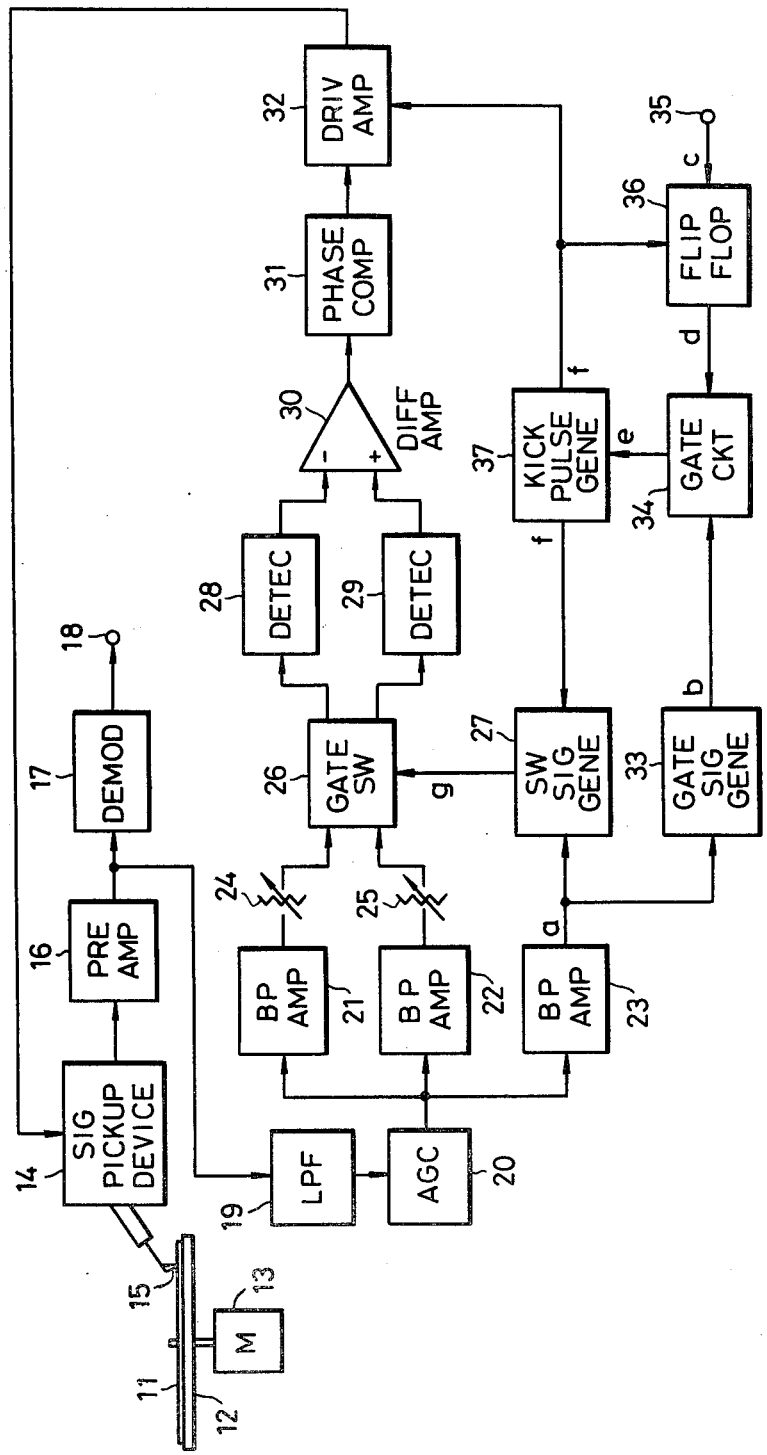
FIG. 1 is a systematic block diagram showing an embodiment of a rotary recording medium reproducing apparatus according to the present invention.

FIGS. 5(A) through 5(G) are diagrams respectively showing signal waveforms at each part of the block system shown in FIG. 1; and FIGS. 6(A) through 6(E) are diagrams respectively showing positional or time relationship between each recorded signal and kick pulse.

DETAILED DESCRIPTION

In FIG. 1, a rotary recording medium (hereinafter simply referred to as a disc) 11 is placed onto a turntable 12, and rotated by a motor 13 at a rotational speed of 900 rpm, for example. A signal pickup device 14, used as a reproducing transducer, has a reproducing stylus 15, and moves continuously and linearly in a direction from the outer peripheral part to the inner peripheral part at a speed equal to the distance of one track pitch per revolution of the turntable 12, during a forward normal reproduction mode. Accordingly, the stylus 15 of the signal pickup device 14 travels radially across the rotating disc 11 and relatively traces the spiral track of the disc 11.

Figure 2:
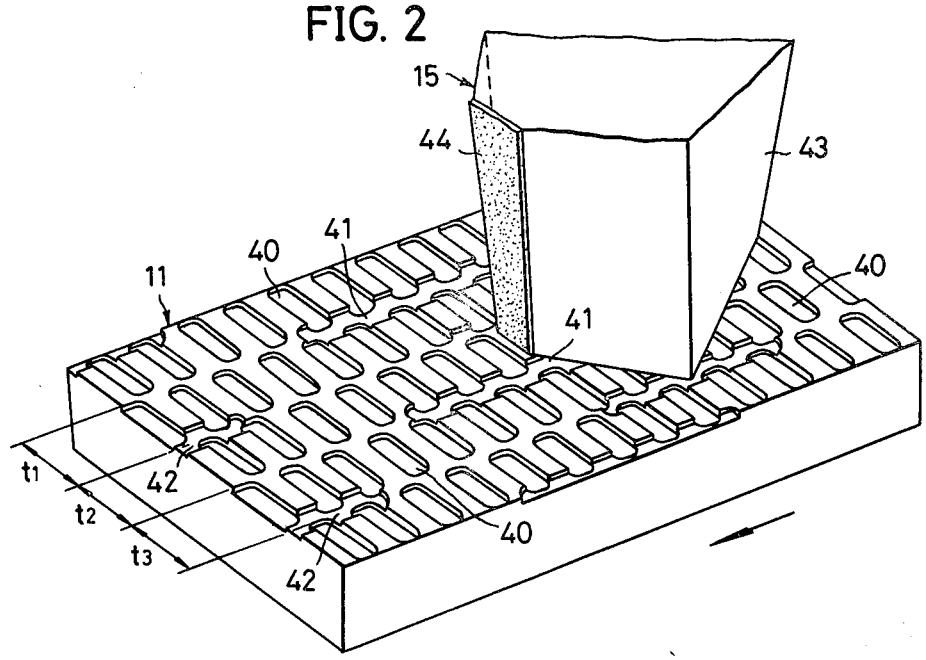
FIG. 2 is a perspective view, in a large scale, showing a part of a rotary recording medium together with a tip end part of a reproducing stylus.

A video signal is recorded on a spiral track with pits formed on the disc 11 according to the information contents of the signal. One part of this track is shown in an enlarged scale in FIG. 2. In FIG. 2, track turns of a single continuous spiral track, corresponding to each revolution of the disc 1, are designated by $t_1$, $t_2$, $t_3$ Each track turn is constituted by the formation of pits 40 of a main information signal along a plane track path and has no stylus guide groove formed therein. With respect to one track turn $t_1$, in every horizontal scanning period (H) at a position corresponding to the horizontal blanking period, pits 41 of a first reference signal fp1 are formed on one lateral side of the track as viewed in the track path direction. Pits 42 of a second reference signal fp2 are formed on the other side of the track.

In an intermediate position between the centerlines of adjacent track turns, only pits of either one kind of the pits 41 and 42 of the above reference signals fp1 and fp2 are formed, and moreover, with respect to one track, the sides on which the pits 41 and 42 are formed are laternated for every track turn. That is, if the pits 41 and 42 are respectively formed on the right and left sides of one track turn, for example, the pits 42 and 41 will respectively be formed on the right and left sides of each of the adjacent track turns.

The tip end of the reproducing stylus 15 has a shape shown in FIG. 2. The reproducing stylus 15 is constituted by a stylus structure 43 having a disc tracing surface which has a width greater than a track width, and an electrode 44 fixed to the rear face of the stylus structure 43. As the reproducing stylus 15 traces along a track on the disc 11 rotating in a direction indicated by an arrow, the video signal recorded thereon by the formation of pits is reproduced as variations in the electrostatic capacitance between the surface of the disc 11 and the electrode 44 of the reproducing stylus 15.

Figure 3:
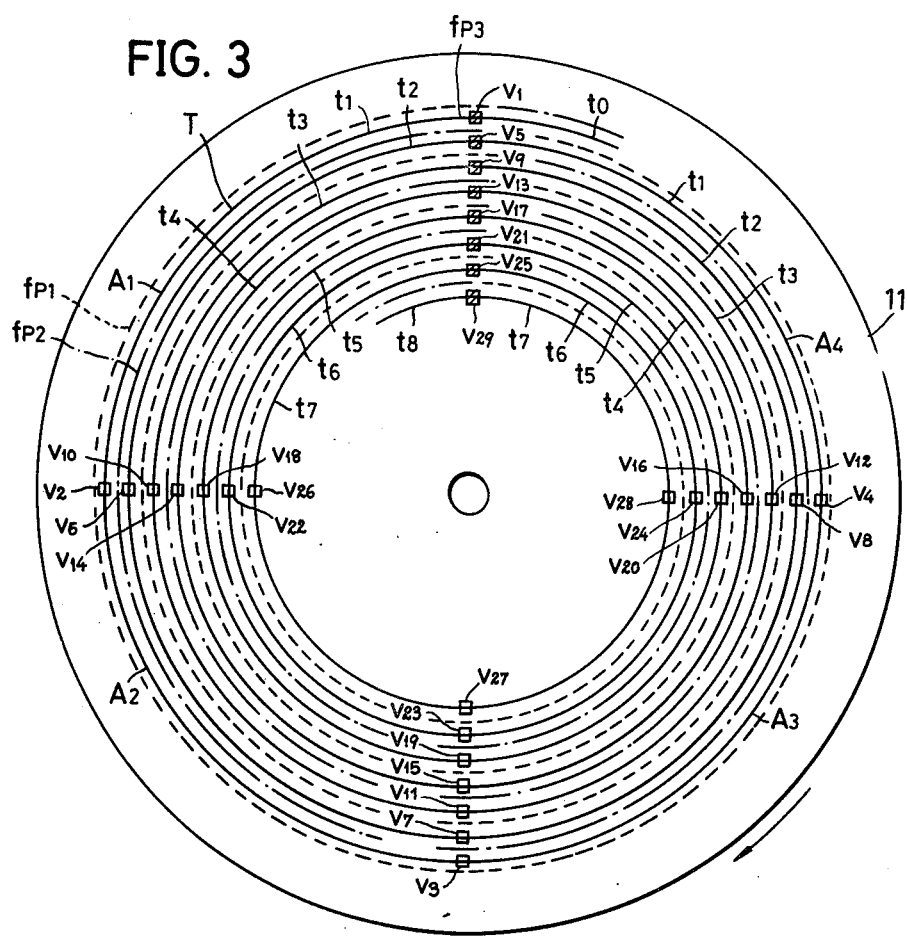
FIG. 3 is a diagrammatic plan view indicating vertical synchronizing signal positions on a track pattern of a rotary recording medium.

On the disc 11, as indicated in FIG. 3, a video signal is recorded along a spiral track T for two frames, that is, four fields, per one revolution of the disc. In FIG. 3, the tracks of the reference signal fp1 is shown by dotted lines while the reference signal fp2 is shown by one-dot chain lines. The positions of the vertical synchronizing signals of respective fields are designated by reference characters V1, V2, V3, . . . , and the successive track parts corresponding to one revolution of the disc of a single spiral track T will respectively be designated by track turns $t_1$, $t_2$, $t_3$, . . . Furthermore, a third reference signal fp3 is recorded at the starting end positions V1, V5, V9, . . . of each of the track turns $t_1$, $t_2$, $t_3$, . . . , that is, at positions where the reference signals fp1 and fp2 change over. A video signal of four fields, namely A1, A2, A3, and A4, is recorded in the track $t_1$.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to this variation in the electrostatic capacitance, and is formed into a signal of a desired level. The resulting output of the preamplifier 16, is demodulated into the original video signal by a demodulator 17 and is obtained as an output through an output terminal 18.

The output signal of the preamplifier 16 is supplied to a lowpass filter 19 wherein the reference signals fp1, fp2, and fp3 are separated. The output reference signals pass through an automatic gain control circuit 20 and are respectively supplied to amplifiers 21, 22, and 23. Here, each of the amplifiers 21, 22, and 23 is a kind of a bandpass amplifier respectively designed to have steep passing frequency characteristics at only the respective frequency fp1, fp2, and fp3. As a result, the signals having frequencies fp1 and fp2 are respectively separated and obtained from the amplifiers 21 and 22. These signals respectively pass through level adjustors 24 and 25, wherein the levels of the signals are adjusted. The resulting signals are then supplied to a gate switching circuit 26.

The reference signal fp3 separated and amplified at this band-pass amplifier 23, is supplied to a switching signal generating circuit 27 and a gate signal generating circuit 33.

The gate switching circuit 26 performs switching of the reference signals fp1 and fp2 every one revolution period of the disc 11 upon normal reproduction, in response to the switching signal generated by the switching signal generating circuit 27 which is applied thereto. Hence, due to the switching signal which reverses polarity every two frames (1/15 seconds), the signals fp1 and fp2 are always alternately supplied to detecting circuits 28 and 29 from the gate switching circuit 26.

The detecting circuits 28 and 29 detect the envelopes of their respective input reference signals and convert the input reference signals into DC voltages. These DC voltages are then supplied to a differential amplifier 30. The differential amplifier 30 compares the output signals of the two detecting circuits 28 and 29 which vary in response to the reproduced levels of the reference signals fp1 and fp2, and generates an output tracking error signal which indicates the direction of the tracking error and the error quantity. This tracking error signal passes through a phase compensation circuit 31 and is further amplified to a specific level by a driving amplifier 32.

The output signal of the driving amplifier 32 is applied to a coil of the signal pickup device 14 as a control signal, to control the signal pickup device 14. As a result, tracking control is performed with respect to the reproducing stylus 15 so that the above tracking error signal becomes zero, that is, so that the reproducing stylus 15 correctly traces over the track T of the disc 11.

Figure 4:
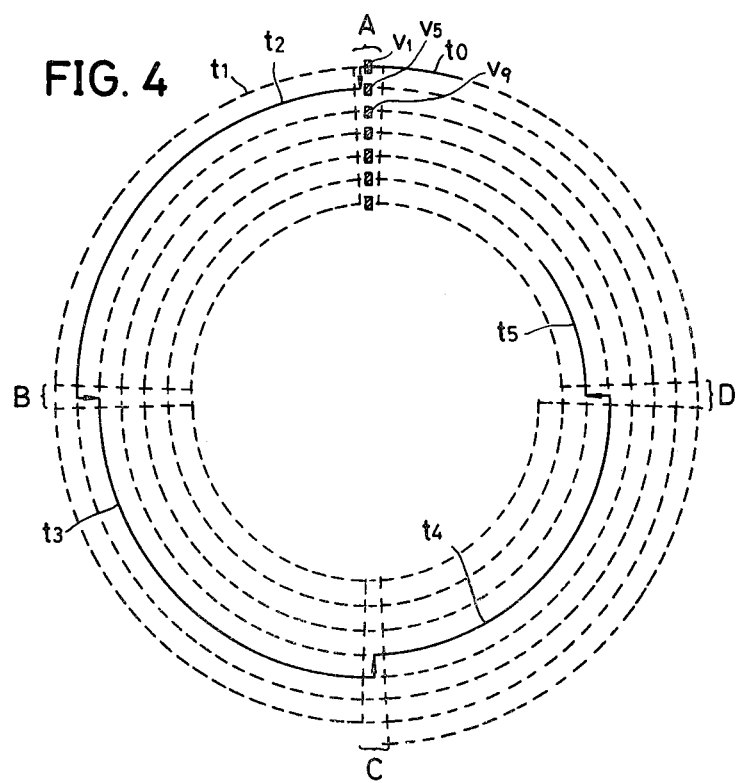
FIG. 4 is a diagram showing a scanning locus of a reproducing stylus on a rotary recording medium upon a special reproduction mode.

Next, description will be given with respect to the operation of the reproducing apparatus according to the present invention during a special reproduction mode. For example, during a quintuple-speed reproduction in the forward direction, the reproducing stylus 15 travels along a tracing locus indicated in FIG. 4. In FIG. 4, parts A, B, C, and D respectively indicate vertical blanking period recorded parts, where the part A is a changeover part between the reference signals fp1 and fp2 which is also the part where the reference signal fp3 is recorded. Further, the solid lines indicate the tracing locus of the reproducing stylus 15, and the dotted lines indicate the center line of a part of the main track which is not reproduced by the reproducing stylus 15. The reproducing stylus 15 is kicked every time the vertical blanking period recorded parts at four positions are reproduced. Accordingly, in this case, the recorded signal at a position which is five tracks after a particular position is reproduced for every one revolution of the disc 11. Hence, quintuple-speed reproduction in the forward direction is thus performed, to produce a reproduced picture of a quintuple-speed reproduction in the forward direction.

Figure 5:
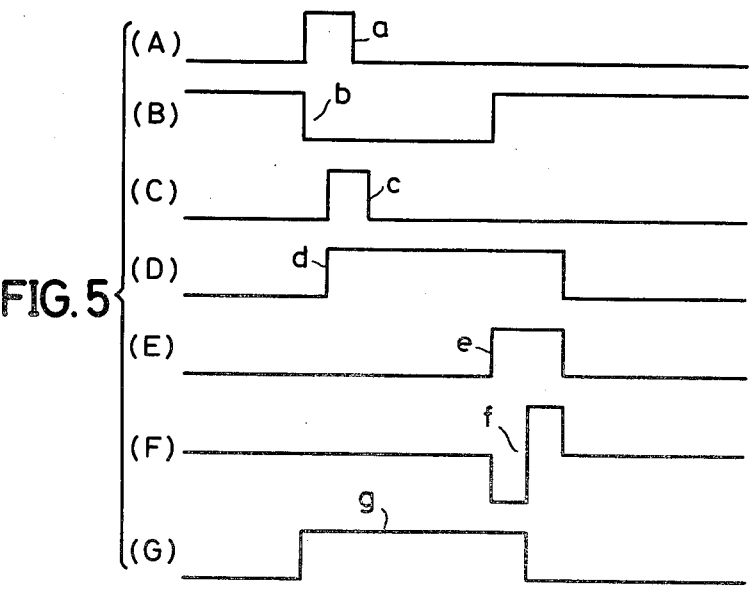

Description will now be given with respect to the operation of the reproducing apparatus according to the present invention at the part A of the disc 11. When the reproducing stylus 15 traces over the position V1 at the above part A, the third reference signal fp3 is reproduced. Hence, a pulse a of the reference signal fp3 indicated in FIG. 5(A), is supplied to the switching signal generating circuit 27 and the gate pulse generating circuit 33. The switching signal generating circuit 27 supplies a switching signal g which becomes of high level (H-level) from low level (L-level) as indicated in FIG. 5(G), to the gate switching circuit 26, to switch the gate switching circuit 26.

Figure 6:
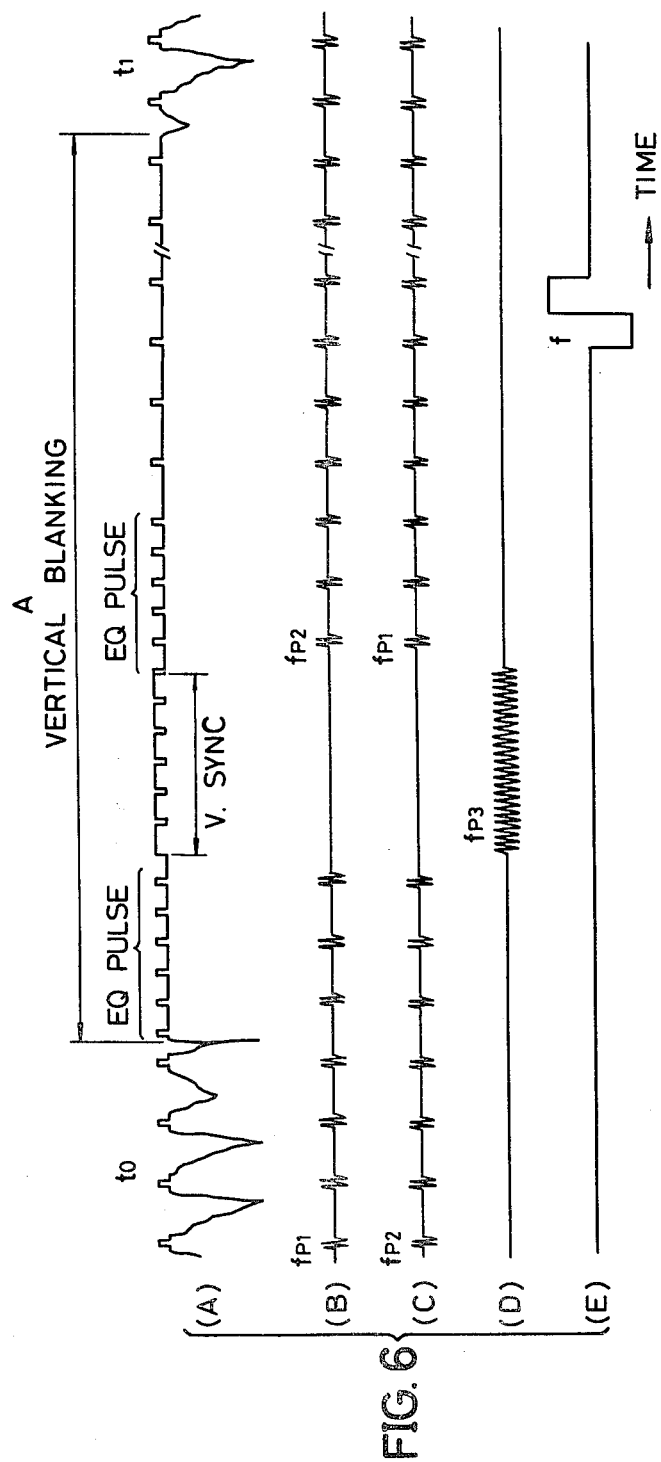

At the part A, a signal in the vertical blanking period indicated in FIG. 6(A), is recorded extending over the main track $t_0$ through the track $t_1$. The third reference signal fp3 indicated in FIG. 6(D) is recorded within the interval of the vertical synchronizing signal in the above vertical blanking period. The first and second reference signals fp1 and fp2 are recorded in intervals corresponding to each horizontal synchronizing signal, throughout the entire interval other than that of the vertical synchronizing signal. Moreover, in a case where the first reference signal fp1 is recorded on a reference signal track on one side with respect to the main track as indicated in FIG. 6(B), the second reference signal fp2 is recorded after the interval of the vertical synchronizing signal at the part A. Similarly, when the second reference signal fp2 is recorded on a reference track on the other side with respect to the above main track as indicated in FIG. 6(C), the first reference signal fp1 is recorded after the interval of the vertical synchronizing signal at the part A.

Accordingly, when the reproducing stylus 15 enters within the vertical blanking period recorded part A, and then further traces within the vertical blanking period recorded part A by passing over the vertical synchronizing signal recorded part, the gate switching circuit 16 is switched over by the switching signal g which reverses polarity according to change in the recorded positions of the first and second reference signals fp1 and fp2. Thus, fine tracking control is continuously performed with respect to the reproducing stylus 15 even within the vertical blanking period recorded part A.

The gate signal generating circuit 33 produces a gate signal b indicated in FIG. 5(B) which becomes of L-level for a predetermined interval according to the pulse a of the reference signal fp3 obtained from the amplifier 23. The above gate signal b thus produced by the gate signal generating circuit 33 is supplied to a gate circuit 34. A pulse c indicated in FIG. 5(C) is applied to a terminal 35 according to a special reproduction mode which has been set (quintuple-speed reproduction in the forward direction in the case of the present embodiment of the invention), and accordingly supplied to a flip-flop 36. The above flip-flop 36 is set by the rise in the pulse c, and supplies a signal d indicated in FIG. 5(D) to the gate circuit 34. The gate circuit 34 opens the gate during the period in which the gate signal b is of H-level, and closes the gate during the period in which the gate signal b is of L-level. Accordingly, the gate circuit 34 performs a gating operation with respect to the signal d according to the gate signal b supplied thereto, to produce and supply a signal e indicated in FIG. 5(E) to a kick pulse generating circuit 37.

The kick pulse generating circuit 37 produces a kick pulse f indicated in FIG. 5(F) according to the signal e supplied thereto. On one hand, the kick pulse f is supplied to the driving amplifier 32, and to the flip-flop 36 to set the flip-flop 36. The kick pulse f supplied to the driving amplifier 32 is supplied to the signal pickup device 14, to shift the reproducing stylus 15 to an adjacent track. As clearly seen from FIGS. 5(F) and 6(E), the kick pulse f is generated within the interval wherein the first and second reference signals fp1 and fp2 for tracking control are recorded, after the interval wherein the third reference signal fp3 is recorded. Hence, in a state where the tracking control operation is stably performed, the reproducing stylus 15 is shifted to an adjacent track by the kick pulse f. Therefore, the tracking control operation is not disturbed even when the reproducing stylus 15 is shifted, and the tracking control operation is continuously performed in a stable manner even after the reproducing stylus 15 is shifted.

On the other hand, the kick pulse f from the kick pulse generating circuit 37 is supplied to the switching signal generating circuit 27. Hence, the level of the switching signal g which is supplied to the gate switching circuit 26 from the switching signal generating circuit 27, changes to L-level from H-level as indicated in FIG. 5(G).

Accordingly, when the reproducing stylus 15 passes the interval of the vertical synchronizing signal within the part A from the track $t_o$, the level of the switching signal g changes and the gate switching circuit 26 performs a switching operation, since the track positions of the reference signals fp1 and fp2 changes over on both the right and left sides with respect to the main track. However, when the reproducing stylus 15 is thereafter shifted by the kick pulse f, the positions of the reference signals fp1 and fp2 with respect to the main track over which the reproducing stylus 15 traces changes over again. At this point, the level of the switching signal g also changes again. Moreover, the gate switching circuit 26 again performs a switching operation. Therefore, the tracking control operation is continuously performed in a smooth and stable manner.

The special reproduction mode is not limited to the above quintuple-speed reproduction in the forward direction described in the above embodiment of the present invention. For example, nine-times-speed, seventeen-times-speed, thirty-three-times-speed, and sixty-five-times-speed reproduction in the forward direction can be obtained, by respectively shifting the reproducing stylus 15 eight times, sixteen times, thirty-two times, and sixty-four times for one revolution of the disc. Moreover, reproduction in the backward direction may be performed by shifting the reproducing stylus towards the track on the outer peripheral side of the disc 11.

The third reference signal fp3 is not recorded in the vertical blanking period recorded parts other than the part A, that is, at the parts B, C, and D, and the first and second reference signals fp1 and fp2 are also recorded in the intervals corresponding to the vertical synchronizing signal. Accordingly, at the above parts B, C, and D, it is not necessary to adjust the timing with which the reproducing stylus 15 is shifted so that the reproducing stylus 15 does not shift within the interval of the vertical blanking signal. At thses parts B, C, and D, the gate signal b remains at H-level, the gate circuit 34 maintains the gate in an open state, and the signal d according to the pulse c is supplied to the kick pulse generating circuit 37 as it is. Hence, the kick pulse generating circuit 37 immediately generates the kick pulse in response to the rise in the signal d, that is, in response to the pulse c. Therefore, the reproducing stylus 15 is shifted at the above parts B, C, and D without avoiding the interval of the vertical synchronizing signal.

Further, the present invention is not limited to these embodiments, but various variations and modifications may be made without departing from the scope of the present invention.

What is claimed is:

1. A reproducing apparatus for reproducing a rotary recording medium by use of a reproducing element, said rotary recording medium being recorded with a main information signal on a spiral main track, first and second reference signals for tracking control on sub tracks provided at substantially center parts between center lines of each track adjacent to said main track so that the sides on which the first and second reference signals are recorded with respect to said main track alternately changes over for each track turn of said main track, and a third reference signal for tracking control on said main or sub track at positions corresponding to recorded positions whereat said first and second reference signals are changed over, said third reference signal being recorded in an interval corresponding to the interval of a vertical synchronizing signal within a vertical blanking period of said main information signal for each of said track turns, said first and second reference signals being recorded within an interval excluding the interval corresponding to that of said vertical synchronizing signal, said reproducing apparatus comprising:

tracking control means for obtaining a tracking control signal from the first and second reference signals reproduced by said reproducing element, to perform a tracking control operation of said reproducing element with respect to said main track; and kick pulse generating means for generating a kick pulse for shifting said reproducing element to an adjacent track during a special reproduction mode, said kick pulse generating means generating the kick pulse so that said reproducing element is shifted at an interval other than the interval in which said reproducing element reproduces said vertical synchronizing signal.

2. A reproducing apparatus as claimed in claim 1 in which said kick pulse generating means generates said kick pulse within an interval other than the interval in which said reproducing element reproduces the vertical synchronizing signal, within said vertical blanking period in which said third reference signal is recorded.

3. A reproducing apparatus as claimed in claim 2 in which said kick pulse generating means generates said kick pulse after said reproducing element reproduces the vertical synchronizing signal.

4. A reproducing apparatus as claimed in claim 1 in which said kick pulse generating means comprises tracking control signal forming means for forming a tracking control signal according to a level difference between said first and second reference signals, switching means for switching and supplying said first and second reference signals to said tracking control signal forming means during a normal reproduction for every revolution of said rotary recording medium, and switching signal generating means for generating a switching signal in response to said reproduced third reference signal and said generated kick pulse, to supply said switching signal thus generated to said switching means.

5. A reproducing apparatus as claimed in claim 4 in which said switching signal generating means generates a switching signal for switching said switching means in response to the reproduced third reference signal and thereafter again switching said switching means to the original state in response to a kick pulse generated within the vertical blanking period.

* * * * *